(12) United States Patent
Sato (10) Patent No.: US 6,516,409 B1
(45) Date of Patent: Feb. 4, 2003

(54) PROCESSOR PROVIDED WITH A DATA VALUE PREDICTION CIRCUIT AND A BRANCH PREDICTION CIRCUIT

(75) Inventor: Toshinori Sato, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/385,449

(22) Filed: Aug. 30, 1999

(30) Foreign Application Priority Data

Oct. 23, 1998 (JP) .......................................... P10-302976

(51) Int. Cl.$^7$ .............................. G06F 9/32; G06F 9/34
(52) U.S. Cl. ........................................ 712/239; 712/237
(58) Field of Search ................................ 712/239, 237, 712/238, 240

(56) References Cited

U.S. PATENT DOCUMENTS

| | | | | |
|---|---|---|---|---|
| 4,991,080 A | * | 2/1991 | Emma et al. ................ | 712/234 |
| 5,848,269 A | * | 12/1998 | Hara .......................... | 712/239 |
| 6,163,839 A | * | 12/2000 | Janik et al. .................. | 712/219 |

OTHER PUBLICATIONS

Wang, Kai and Manoj Franklin, "Highly Accurate Data Value Prediction Using Hybrid Predictors," 13$^{th}$ IEEE/ACM International Symposium on Microarchitecture Proceedings, 1997, 281–290.*

Emer, Joel and Nikolas Gloy, "A Language for Describing Predictors and its Application to Automatic Synthesis," 24$^{th}$ International Symposium on Computer Architecture Proceedings, ACM 1997, pp. 304–314.*

Gonzalez, Jose and Antonio Gonzalez, "Control–Flow Speculation through Value Prediction for Superscalar Processors," International Conference on Parallel Architectures and Compilation Techniques, 1999, pp. 57–65.*

Marcuello, Pedro Antonio Gonzalez, "Data Speculative Multithreaded Architecture," 24$^{th}$ Euromicro Conference Proceedings, IEEE 1998, vol. 1, pp. 321–324.*

Sato, "First Step to Combining Control and Data Speculation," Proceedings of International Workshop on Innovative Architecture, Oct. 1998.

* cited by examiner

Primary Examiner—Richard L. Ellis
Assistant Examiner—Tonia Meonske
(74) Attorney, Agent, or Firm—Foley & Lardner (57) ABSTRACT

A processor includes at least one functional unit configured to execute an instruction. The processor also includes an instruction window configured to supply the instruction to the functional unit. The processor further includes a register file configured such that data and a result of execution of the instruction are temporarily stored in the register file. The processor still further includes a branch prediction circuit having a branch execution unit and a branch prediction table. The processor also includes a data value prediction circuit configured to predict a first operand value which will be used by the functional unit and a second operand value which will be used by the branch execution unit to predict a direction of a branch and to store the direction of the branch in the branch prediction table. With such a processor, a branch prediction is made by executing a branch instruction rather than by referring to the history of the branch instruction.

8 Claims, 6 Drawing Sheets

FIG.4
Prior Art $\begin{cases} I_1: \text{load} \quad \gamma 2 \leftarrow \gamma 1(0) \\ I_2: \text{add} \quad \gamma 10 \leftarrow \gamma 2 + \gamma 3 \end{cases}$

PROCESSOR PROVIDED WITH A DATA VALUE PREDICTION CIRCUIT AND A BRANCH PREDICTION CIRCUIT

BACKGROUND OF THE INVENTION

1. Field of the Invention

The present invention is related to an improved processor provided with a data value prediction circuit and a branch prediction circuit. In particular, the present invention is related to an improved processor provided with a data value prediction circuit and a branch prediction circuit which makes it possible to improve the efficiency of supplying instructions.

2. Prior Art

Along with the increasing level of superscalar parallelism and the increasing number of superpipelined stages, the disturbance of control flow due to branch instructions tends to increasingly affect the overall performance of a processor system. While the performance penalty due to branch instructions has been recognized and examined for years) after introducing the pipelined control into processors, the parallelism of execution of instructions has been attracted interest of engineers resulting in the importance of the handling of branch instructions. The branch prediction technique has been employed in order to alleviate the influence of branch instructions. Namely, the history of the branch instruction as taken or not taken is written into a table with reference to which is predicted the result of the branch instruction.

Figure 1:
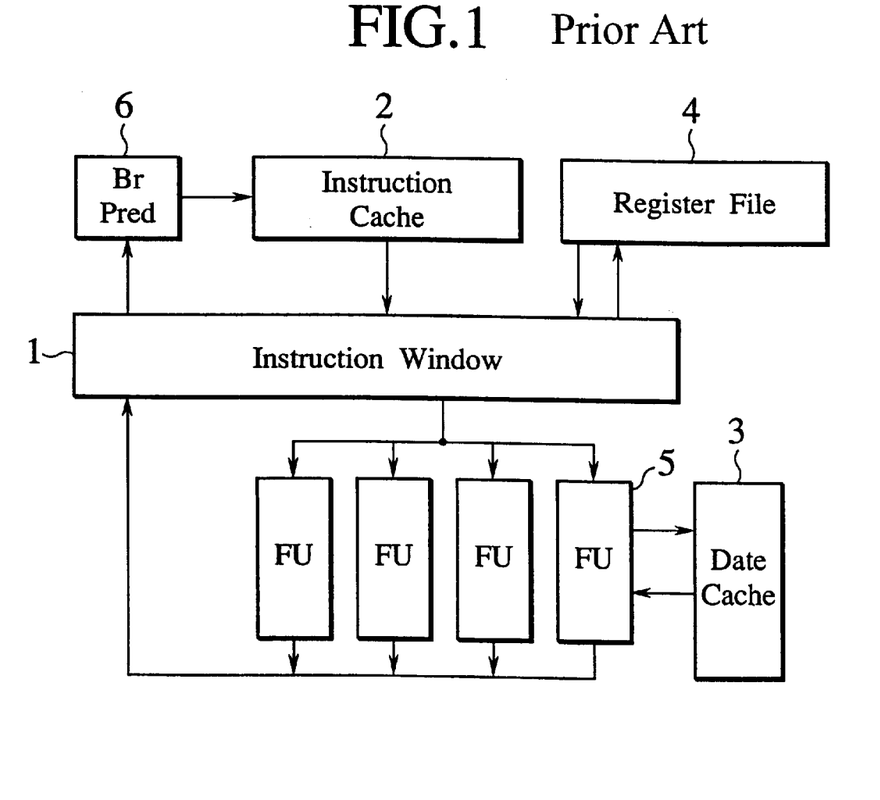
FIG. 1 is a schematic diagram showing an example of a processor provided with a branch prediction circuit in accordance with a prior art technique.

FIG. 1 is a schematic diagram showing an example of a processor provided with a branch prediction circuit. Instructions is read from the instruction cache 2 and stored in an instruction window 1 by means of the processor. Instructions latched by the instruction window 1 is ready to be dispatched to the functional units 5 when necessary operands becomes available and received by one of the functional units 5, which then execute the instruction as dispatched. The result of the execution is broadcasted in the instruction window 1 and, at the same time, stored in the register file 4 after completion of execution. Some instructions may be executed with operands as read from the data cache 3. The branch prediction circuit 6 conducts branch prediction in order to inform the instruction cache 2 of the address of the instruction to be fetched.

Figure 2:
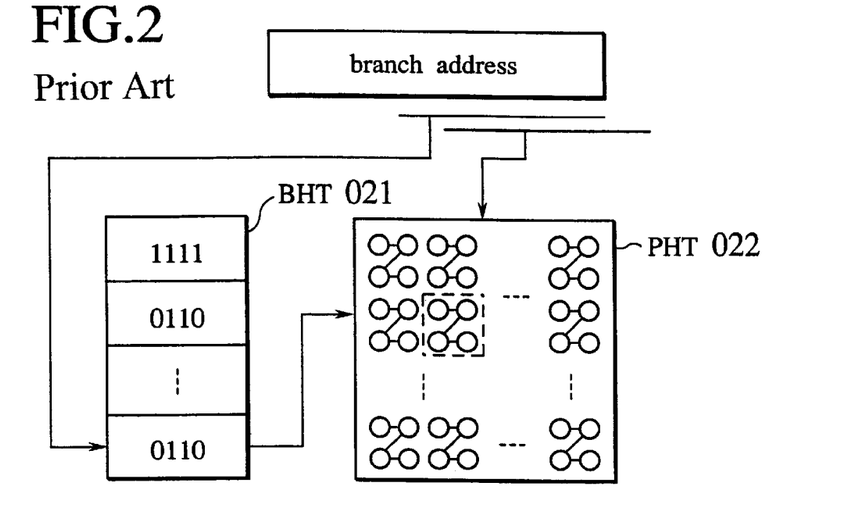
FIG. 2 is a schematic diagram showing an example of the two-level adaptive branch prediction circuits, i.e., PAs.

The two-level adaptive branch prediction circuit is a subject of great interest among a number of the branch prediction circuits because of the high accuracy of branch prediction that is expected. The two-level adaptive branch prediction circuit is composed of two tables. FIG. 2 is a schematic diagram showing an example of the two-level adaptive branch prediction circuits, i.e., PAs. One table is referred to as BHT (Branch History Table) 021 composed of a plurality of shift registers. The shift registers are referred to as Branch History Registers (BHR). Each BHR is provided with one of the branch instructions and stores the history of the branch instruction corresponding thereto. Namely, each BHT is indexed with the address of the corresponding branch instruction. When the direction of a branch, i.e., taken(1) vs. not-taken(0), is decided, the result is inputted to the BHR. At this time, the oldest result is shifted out. The second table is indexed with the addresses of the branch instructions and the patterns of the history of the respective branch instructions.

Figure 3:
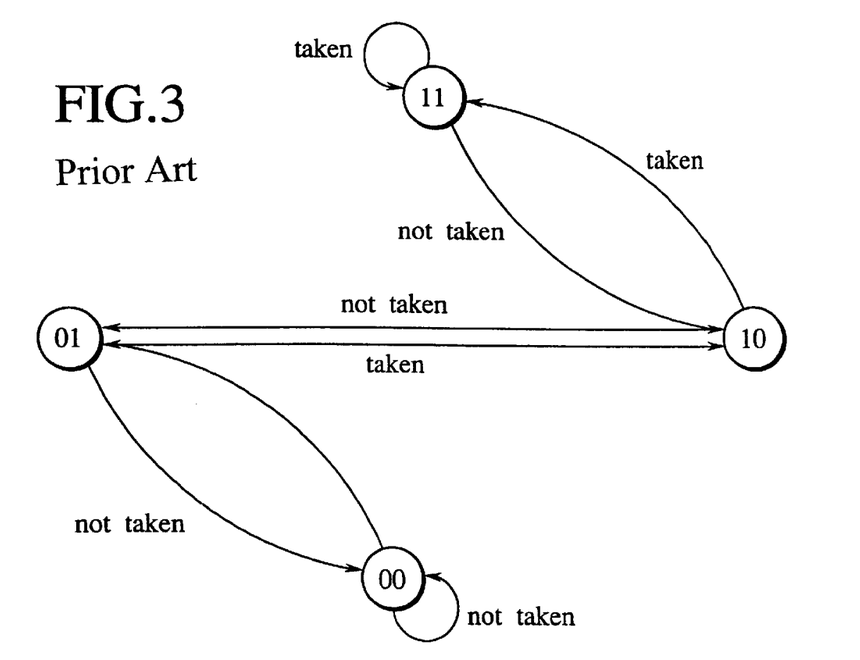
FIG. 3 shows the state transition of the counter the branch prediction circuit.

The second table is referred to as Pattern History Table (PHT) 022 comprising a number of 2-bit counters with reference to which the branch prediction is conducted. If the branch is taken the corresponding counter is incremented by one, while if the branch is not taken the corresponding counter is decremented by one. The counter is saturated at its maximum and minimum values. The branch is predicted with reference to the most significant bit of the corresponding counter. Namely, if the most significant bit is 1 the branch is predicted as taken while if the most significant bit is 0 the branch is predicted as not taken. FIG. 3 shows the state transition of the counter. For example, the BHT is indexed with the lower part of the address of a branch instruction to read the history of "0110". The PHT is indexed with the history of "0110" and the lower part of the address of a branch instruction. The 2-bit counter as shown in broken lines is then pointed to. The direction of a branch (taken vs. not-taken) is predicted with reference to the value of the counter. Other types of the two-level adaptive branch prediction circuits have been described in several references, e.g., T-Y.Yeh, Y. N.Patt, "Alternative Implementation of Two Level Adaptive Branch Prediction", 19th, International Symposium on Computer architecture (ISCA), 1992.

On the other hand, in the recent years, the data value prediction technique attracts interest of many researchers. Dependence disturbing processor performance includes the name dependence and the data dependence in addition to the control dependence due to the branch instruction. The name dependence is caused by resource shortage, i.e., the shortage of available registers, and can be eliminated using register renaming. However, the data dependence can not be removed by such techniques, as it is called true dependence. Hence, the data dependence is a serious obstacle limiting instruction level parallelism.

The data value prediction technique is proposed in order to remove the data dependence by speculative execution and improve the performance of the processor. Namely, the instruction having the data dependency upon a preceding instruction is executed speculatively by predicting a source operand as required. Instructions having a data dependency can therefore be executed in parallel which execution is inherently impossible.

Figure 4:
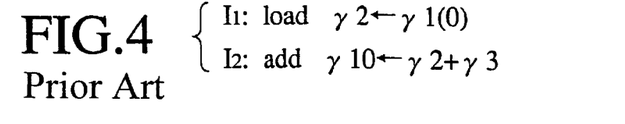
FIG. 4 shows instructions showing an example of such a data dependency.
Figure 5:
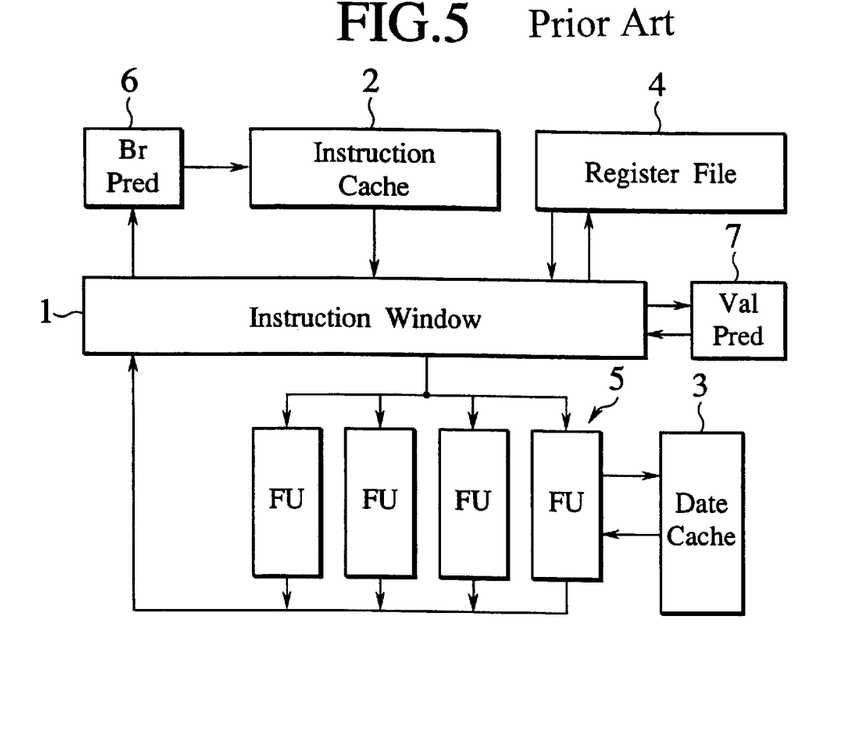
FIG. 5 is a schematic diagram showing an example of a processor provided with a data value prediction circuit in accordance with a prior art technique.
Figure 6:
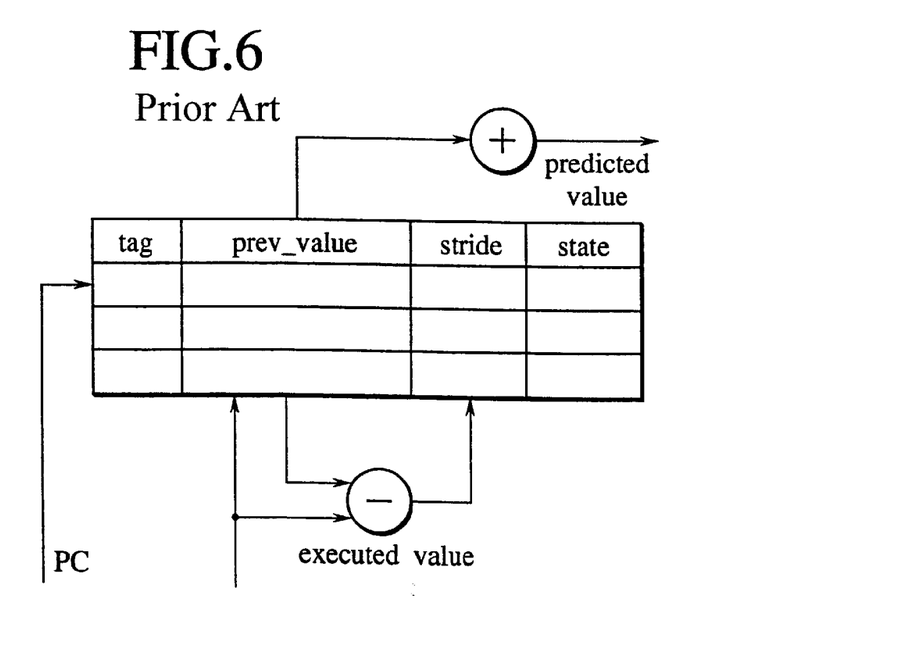
FIG. 6 is a schematic diagram showing an example of the data value prediction circuit as illustrated in FIG. 5.

FIG. 4 shows instructions showing an example of such a data dependency. Namely, the instruction I1 and the instruction I2 have a data dependency and therefore can not be executed in parallel which execution is inherently impossible. However, the instruction I1 and the instruction I2 can be executed by predicting the source operand γ2 of the instruction I2. FIG. 5 is a schematic diagram showing an example of a processor provided with a data value prediction circuit. Instructions with source operands which have not been calculated yet are executed by the use of values of the source operands as predicted by the data value prediction circuit 7. FIG. 6 is a schematic diagram showing an example of the data value prediction circuit 7 as illustrated in FIG. 5. The data value prediction circuit 7 has been designed in a hardware structure similar to that of the instruction cache 2. The history of the execution results as calculated is stored in the data value prediction circuit 7. Each entry of the data value prediction circuit 7 is indexed with the address PC of the program counter. Namely, each entry of the data value consists of the latest result of the operation (pred_value), the stride of the result of the operation (stride) and the state of the entry indicative of whether or not the prediction is possible. The stride value is obtained as the difference between the latest two results of the execution of the same instruction while the state value is stored by encoding the history of the execution results and indicates whether or not the prediction is possible.

The state transition as required is realized by means of the 2-bit saturation type counter as illustrated in FIG. 3. If a value prediction succeeds, the counter is incremented while the counter is decremented if it fails. When the tag is matched, the pred_value and the stride value are obtained from the entry as pointed by the address PC. The operand value as predicted is therefore calculated as the sum of the pred_value and the stride value. The state value is obtained at the same time. If the state value is PREDICT or WEAKLY_PREDICT, the operand value as predicted is used for executing an instruction requiring the operand. The data value prediction is otherwise not conducted. Other types of the data value prediction circuit 7 have been described in several references, e.g., M. H. Lipasti, J. P. Shen, "Exceeding the Dataflow Limit via Value Prediction", 29th International Symposium on Microarchitecture (MICRO), 1996, Y. Sazeides, J. E. Smith, "The Predictability of Data Value", 30th International Symposium on Microarchitecture (MICRO), 1997, K. Wang, M. Franklin, "Highly Accurate Data Value Prediction using Hybrid Predictors", 30th International Symposium on Microarchitecture (MICRO), 1997.

As explained in the above, it has been proposed to make use of the branch prediction technique or the data value prediction technique in order to improve the performance of processors. However, there are following shortcomings in the conventional technique.

The branch prediction technique has been examined for many years so that further improvement is substantially difficult. For example, a genetic algorithm has been proposed in order to improve the accuracy of branch prediction as illustrated in J. Emer, N. Gloy, "A Language for Describing Predictors and its Application to Automatic Synthesis", 24th International Symposium on Computer Architecture (ISCA), 1997. This reflects the limits of improving the accuracy of branch prediction.

On the other hand, in the case of the data value prediction, it is difficult to accomplish reasonable improvement of performance as seen from the additional cost for necessary hardware modification for introducing the data value prediction since the granularity of the speculative execution is substantially small. For example, it has been reported that, in spite of the accuracy of value prediction of over 90%, the improvement of performance is only of the order of 0.3%, T. Sato, "Load Value Prediction using Two-Hop Reference Address Renaming", 4th International Conference on Computer Science and Informatics (IC&S), 1998.

Furthermore, while the branch prediction and the value prediction have been separately researched, it has been reported that there are problems when the two prediction techniques are used in combination. For example, it has been reported that the accuracy of branch prediction is deteriorated when the data dependency is resolved speculatively in T. Sato, "Speculative Resolution of Ambiguous Memory Aliasing", International Workshop on Innovative Architecture for Future Generation High-Performance Processors and Systems (IWIA), 1997.

SUMMARY OF THE INVENTION

The present invention has been made in order to solve the shortcomings as described above. It is an important object of the present invention to provide an improved processor provided with both a data value prediction circuit and a branch prediction circuit capable of predicting branch directions with a higher degree of accuracy of branch prediction.

It is another object of the present invention to provide an improved branch prediction circuit provided with both a data value prediction circuit and a branch prediction circuit capable of predicting branch directions with a higher degree of accuracy of branch prediction.

In brief, the above and other objects and advantages of the present invention are provided by a new and improved A processor comprising: at least one functional unit for executing instructions; a plurality of registers connected to said functional unit for temprarily storing data and the result of execution of an instruction; means connected to said functional unit for supplying instructions to said functional unit; a data value prediction circuit for receiving the results of execution of instructions and predicting operand values for use in future execution of instructions; and a branch prediction circuit for predicting the direction of a branch; said branch prediction circuit executes a branch instruction by the use of an operand value as predicted by said data value prediction circuit.

Also, in accordance with a preferred embodiment of the present invention, the processor further comprises a cache memory for storing instructions and data.

Furthermore, in accordance with a further preferred embodiment of the present invention, the processor further comprises an instruction buffer for storing instructions.

Furthermore, in accordance with a further preferred embodiment of the present invention, the result of the execution of the branch instruction is used for predicting the direction of the branch.

Furthermore, in accordance with a further preferred embodiment of the present invention, the processor further comprises a cache memory for storing instructions and data.

Furthermore, in accordance with a further preferred embodiment of the present invention, wherein the result of the execution of the branch instruction is used for evaluating a branch prediction.

In accordance with another aspect of the present invention, a processor comprising: a plurality of functional units for executing instructions, said functional units including a branch unit for executing branch instructions; means connected to said functional units for supplying instructions to said functional unit; a plurality of registers connected to said functional unit for temprarily storing data and the result of execution of an instruction; a data value prediction circuit for receiving the results of execution of instructions and predicting operand values for use in future execution of instructions; and a branch prediction circuit for predicting the direction of a branch; wherein said data value prediction circuit outputs in the same cycle a first operand value as predicted for use in executing first execution of a first branch instruction as read from an address and a second operand value as predicted for use in executing second execution subsequent to said first execution of the first branch instruction as read from the same address, wherein said branch unit executes the first branch instruction by the use of said first operand value while said branch prediction circuit predicts the direction of the branch by executing the first branch instruction by the use of said second operand value.

In accordance with another aspect of the present invention, a branch prediction circuit for use in a processor executing instructions in accordance with an address latched by a program counter comprising: means for predicting, by the use of past operand data, a first operand value for use in executing first execution of a branch instruction as read from an address of a memory; means for predicting, by the use of said first operand value, a second operand value for use in executing second execution subsequent to said first execution of the branch instruction as read from the same address; means for executing the branch instruction by the use of said second operand value; means for storing the result of the execution by said executing means as a prediction value; and means connected to said program counter for outputting said prediction value when the address latched by said program counter matches the address of the branch instruction.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION OF EMBODIMENTS

Figure 7:
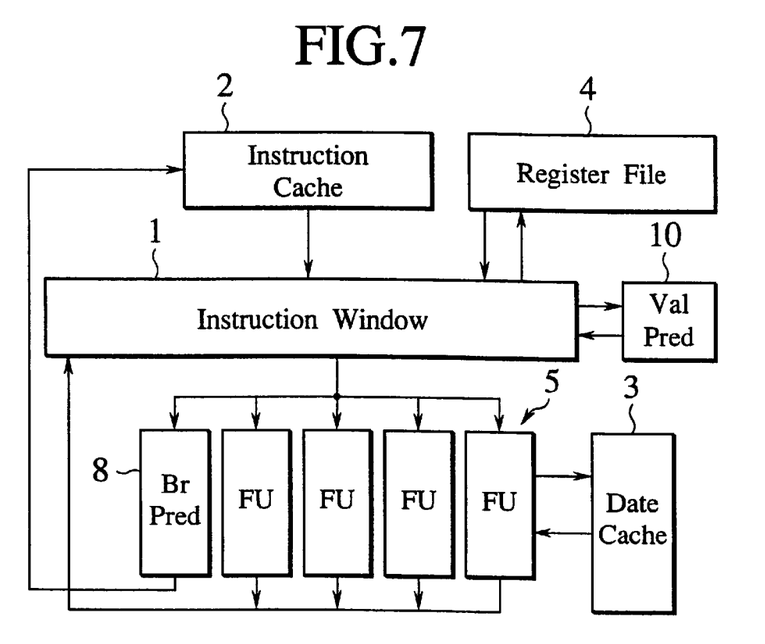
FIG. 7 is a schematic diagram showing an example of the processor making use of a branch prediction circuit in accordance with a first embodiment of the present invention.

FIG. 7 is a schematic diagram showing an example of the processor making use of a branch prediction circuit in accordance with a first embodiment of the present invention. In the drawings, like reference numbers indicate identical or functionally similar elements as the conventional technique as illustrated in FIG. 5 and throughout the following embodiments, and therefore redundant explanation is not repeated. The branch prediction circuit 6 as illustrated in FIG. 5 is replaced by a new type branch prediction circuit 8 in accordance with the present invention. The branch prediction circuit 8 in accordance with the present invention is located in the same stage as the functional units 5 since the branch prediction circuit 8 actually executes branch instructions. Also, the data value prediction circuit 7 as illustrated in FIG. 5 is replaced by a new type data value prediction circuit 10 in accordance with the present invention. The data value prediction circuit 10 is designed to predict succeeding two data values as opposed to the case of the data value prediction circuit 7. Namely, the data value prediction circuit 10 is capable of predicting not only a first data value as the operand for executing an instruction but also a second data value as the operand for executing that instruction appearing the next time at the same PC address.

Of course, the functional unit 5 executes the instruction in a usual manner by the use of the first data value (current operand) which is predicted by the data value prediction circuit 10. On the other hand, the branch prediction circuit 8 executes the instruction by the use of the second data value (next operand) which is predicted at the same time by the data value prediction circuit 10. The direction of a branch (taken vs. not-taken) as the result of the execution by the branch prediction circuit 8 is stored in a table provided within the branch prediction circuit 8.

Figure 8:
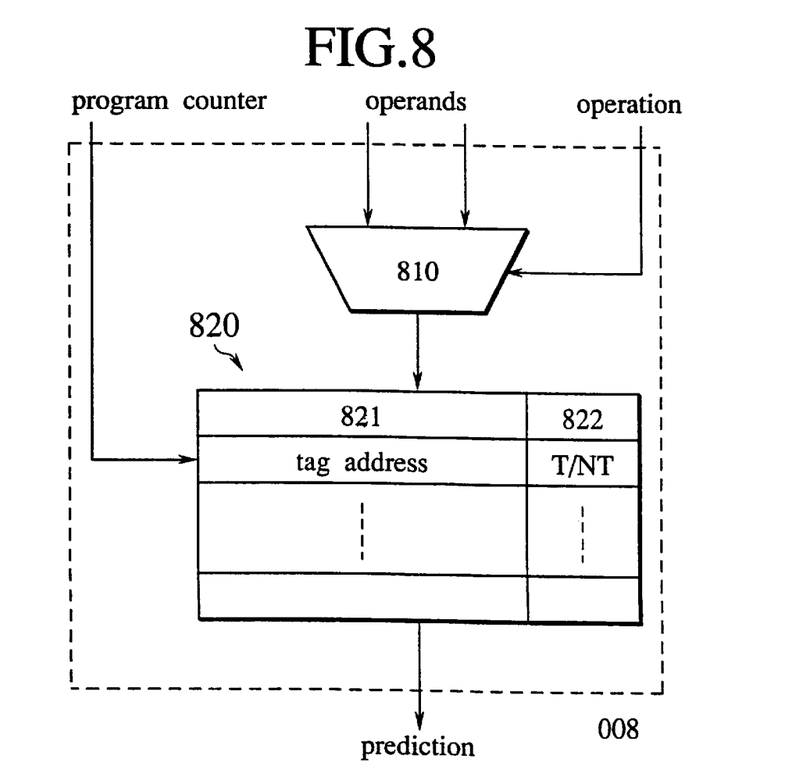
FIG. 8 is a schematic block diagram showing the branch prediction circuit consisting of a branch execution unit and a branch prediction table in accordance with a first embodiment of the present invention.

FIG. 8 is a schematic block diagram showing the branch prediction circuit 8 consisting of a branch execution unit 810 and a branch prediction table 820. The branch execution unit 810 decides the direction of a branch (taken vs. not-taken) in accordance with the operation of the branch instruction with reference to the operand as predicted. The branch prediction table 820 is composed of a tag address field 821 and a branch prediction field 822 for storing the direction of a branch (taken vs. not-taken) as the result of the execution by the branch execution unit 810. The tag address field 821 stores tags, i.e., part of the addresses of the respective branch instructions, for identifying the addresses of the instructions of the respective branch instruction. The branch prediction table 820 is referred to by the program counter, i.e., comparing the tag address field 821 with the address of the instant instruction. When the address of the instruction matches the tag address field 821, the value of the branch prediction field 822 is referred to. Namely, the direction of a branch (taken vs. not-taken) as predicted can be obtained by accessing the branch prediction circuit 8 with reference to the branch instruction.

Figure 9:
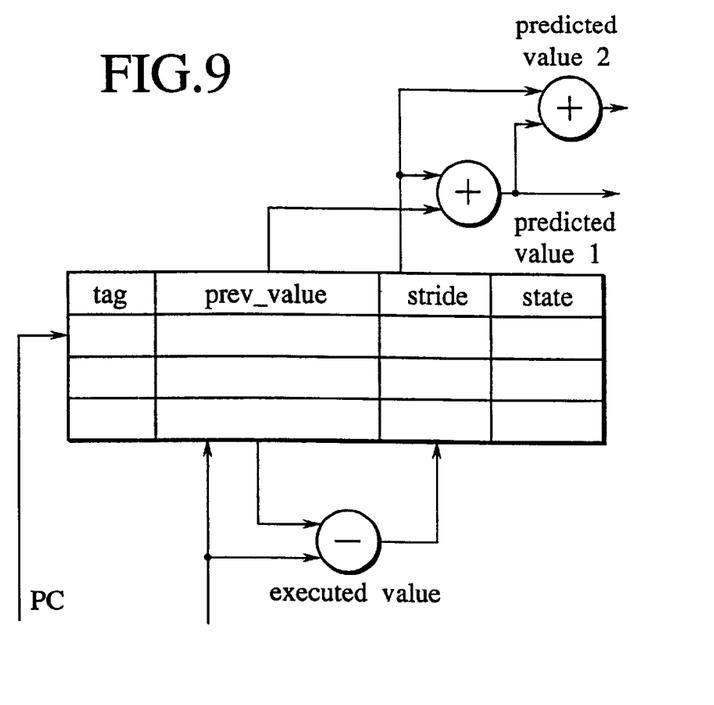
FIG. 9 is a schematic diagram showing the structure of the data value prediction circuit used in the first embodiment of the present invention.

FIG. 9 is a schematic diagram showing the structure of the data value prediction circuit 10 used in the first embodiment of the present invention. As opposed to the prior art data value prediction circuit 7 as illustrated in FIG. 5, the second operand value as predicted (predicted value 2) is obtained by adding the stride twice to the previous value. The functional unit 5 executes the instruction by the use of the first data value (predicted value 1) while the branch prediction circuit 8 executes the same instruction by the use of the second data value. Namely, the branch prediction circuit 8 executes the branch instruction the next time the same branch instruction appears at the same address. Accordingly, when the same branch instruction actually is executed again, the direction of a branch as predicted can be immediately obtained by accessing the branch prediction circuit 8 with reference to the address of the instruction.

The data value prediction technique of the branch prediction circuit in accordance with the present invention is not limited to that as described above, but other types of the data value prediction techniques can be used for the same purpose. For example, two conventional data value prediction circuit each capable of predicting the data value are connected to each other in a cascade arrangement. The data value prediction circuit in the second stage conducts data value prediction by the use of the value as predicted by the data value prediction circuit in the first stage.

Namely, the first operand value as predicted for use as the operand of the next execution is calculated by the use of the past operand values with respect to the instruction corresponding to the same address of the program counter. This procedure is the same as in the prior art technique. In the case of the data value prediction circuit in accordance with the present invention, the second operand value as predicted for use as the operand of the further execution subsequent to the above next execution is calculated also by the use of the first operand value as predicted.

As detailedly explained in the above, the branch prediction circuit 8 in accordance with the present invention conducts the prediction by obtaining the operand from the data value prediction circuit 10.

Figure 10:
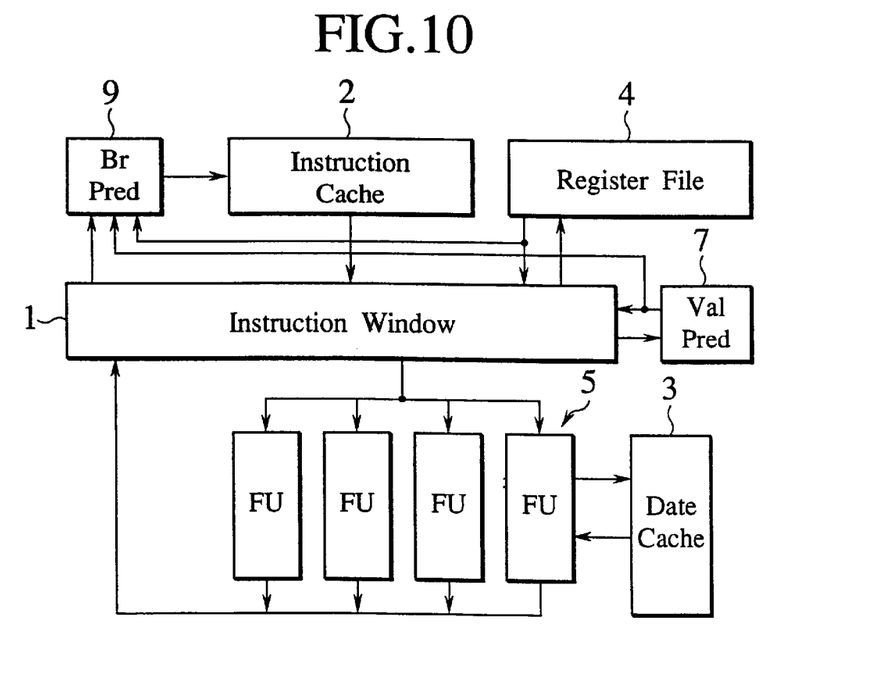
FIG. 10 is a schematic diagram showing another example of the processor making use of a branch prediction circuit in accordance with a second embodiment of the present invention.

FIG. 10 is a schematic diagram showing another example of the processor making use of a branch prediction circuit in accordance with a second embodiment of the present invention. In this case, the branch prediction circuit 6 as illustrated in FIG. 5 is replaced by a new type branch prediction circuit 9 in accordance with the present invention. The branch prediction circuit 9 is connected not only to the instruction window 1 but also the register file 4 and the data value prediction circuit 7. The branch prediction circuit 9 obtains operands from the register file 4 and the data value prediction circuit 7 and conducts prediction of the result of a branch instruction by actual execution of the branch instruction. Namely, the branch prediction circuit 9 is the same hardware as in the branch unit among the functional units 5. In other words, the similar hardware components are redundantly provided as the branch unit of the functional units 5 and as the branch prediction circuit.

The difference is that the branch unit makes use of the operands which have been determined and are obtained from the instruction window 1 and the register file 4 while the branch prediction circuit 9 makes use of the operands which have been predicted by the data value prediction circuit 7. Accordingly, while the hardware element is same as in known processors, the connection and the operational meaning are different.

In the case of this embodiment of the present invention, the data value prediction circuit of the branch prediction circuit is not limited to that as described above, but other types of the data value prediction circuits can be used for the same purpose. However, in the case of in this embodiment of the present invention, a conventional data value prediction circuit can be used without modification.

As compared with the first embodiment of the present invention, this embodiment of the present invention is different as follows. Namely, in the case of the first embodiment, the next operation of the branch instruction is executed when executing the branch instruction in order to obtain and save the result of the execution as the branch prediction. On the other hand, in the case of the second embodiment, the branch prediction is not obtained from a table, in which is stored the direction of each branch (taken vs. not-taken) as predicted, but obtained by executing the branch instruction just after fetching the instruction.

More specifically speaking, if a branch instruction is detected in the instruction window 1, an operand value as predicted is transferred to the branch prediction circuit directly from the data value prediction circuit. The branch prediction circuit serves as the branch unit in order to execute the branch instruction by the use of the operand value as predicted. Subsequent instructions are prefetched in accordance with the result of the execution of the branch instruction.

Accordingly, as compared with the first embodiment of the present invention, this embodiment of the present invention results in a relatively complicated layout of wirings necessary to obtain the operand required for the execution. On the other hand, in this embodiment of the present invention, there is no need for saving the result of prediction and providing the branch prediction table 820 as in the first embodiment of the present invention.

As detailedly explained in the above, the branch prediction circuit 9 in accordance with the present invention conducts the prediction by obtaining the operand from the data value prediction circuit 10.

Figure 11:
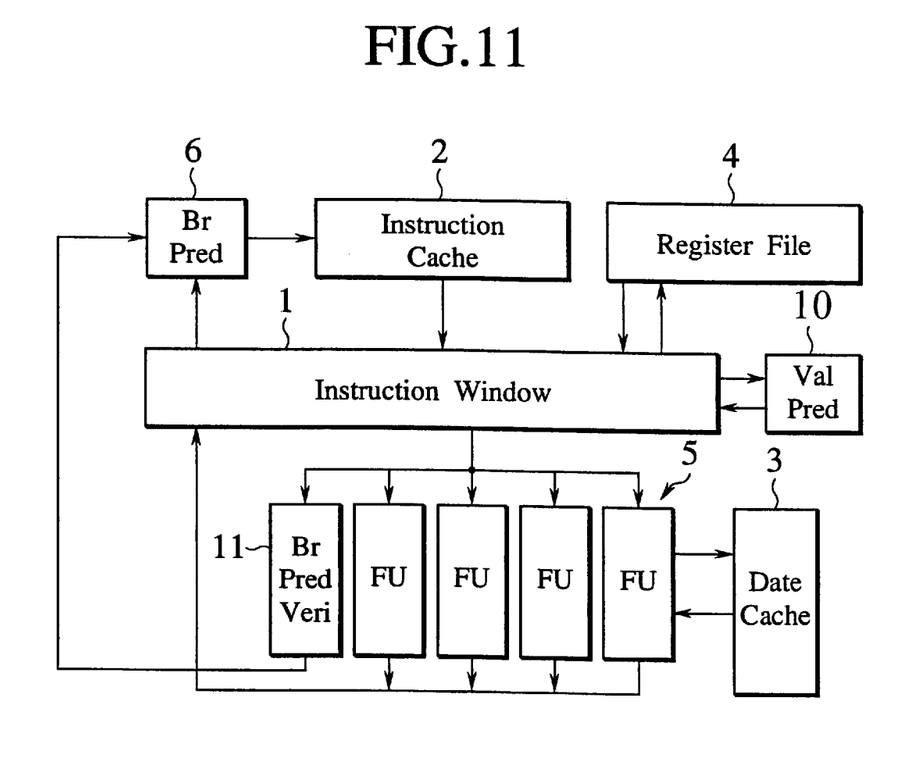
FIG. 11 is a schematic diagram showing an example of the processor making use of a branch prediction circuit in accordance with a third embodiment of the present invention.

FIG. 11 is a schematic diagram showing an example of the processor making use of a branch prediction circuit in accordance with a third embodiment of the present invention. In this case, the branch prediction circuit in accordance with the present invention is utilized as a branch prediction evaluation circuit. The data value prediction circuit 7 of the processor as illustrated in FIG. 5 is replaced by the data value prediction circuit 10. Furthermore, a branch prediction evaluation circuit 11 is additionally provided. The branch prediction evaluation circuit 11 is identical or functionally similar to the branch prediction circuit 8 in order to execute a branch instruction by the use of the operand as predicted by the data value prediction circuit 10. The direction of a branch (taken vs. not-taken) as predicted by the branch prediction circuit 6 is evaluated by the branch prediction evaluation circuit 11 on the basis of the result of the execution of the branch instruction. Because of this, it is possible to evaluate the direction of a branch (taken vs. not-taken) as predicted by the branch prediction circuit 6 prior to the determination by the actual execution of the branch instruction.

Namely, in accordance with the branch prediction evaluation circuit 11 of this embodiment of the present invention, it is possible to evaluate the direction of a branch as predicted by the branch prediction circuit 6 by obtaining the operand from the data value prediction circuit 10 and executing the branch instruction.

As detailedly explained in the above, in accordance with the present invention, the branch prediction is made by actually executing a branch instruction rather than by referring to the history of the branch instruction so that it is possible to easily improve the accuracy of branch prediction.

Furthermore, there is another type of advantages as followings in accordance with the present invention. Namely, in the case of branch instructions, it is often the case that the result of the execution of the branch instruction is correct even if the operand as predicted by the data value prediction circuit is not correct. This is because the result of the execution of the branch instruction is depending only upon the difference between two operand values. Accordingly, in accordance with the branch prediction circuit of the present invention, it is possible to further improve the accuracy of branch prediction as compared with the accuracy of operand prediction.

Furthermore, penalty due to misprediction is lessened by evaluating whether or not the prediction is correct in advance by the use of the result of the execution of the branch instruction conducted with the operand value as predicted.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A processor comprising:
   at least one functional unit configured to execute an instruction;
   an instruction window configured to supply said instruction to said at least one functional unit;
   a register file configured such that data and a result of execution of said instruction are temporarily stored in said register file;
   a branch prediction circuit having a branch execution unit and a branch prediction table; and
   a data value prediction circuit configured to predict a first operand value which will be used by said at least one functional unit in execution of a branch instruction which is read from an address of a memory and a second operand value which will be used by said branch execution unit which is configured to predict a direction of a branch in subsequent execution of said branch instruction which is read from the same address of said memory and to store said direction of said branch in said branch prediction table.

2. The processor as claimed in claim 1, further comprising a cache memory buffer configured to store instructions and data.

3. The processor as claimed in claim 1, further comprising an instruction buffer configured to store instructions.

4. The processor as claimed in claim 1, wherein a result of execution of said branch instruction is used for predicting said direction of said branch.

5. The processor as claimed in claim 4, further comprising a cache memory buffer configured to store instructions and data.

6. The processor as claimed in claim 4, further comprising an instruction buffer configured to store instructions.

7. The processor as claimed in claim 1, wherein a result of execution of said branch instruction is used for evaluating a branch prediction.

8. A processor comprising:
   a data value prediction circuit configured to receive results of execution of instructions and to output a first predicted operand value which will be used in execution of a branch instruction which is read from an address of a memory and a second predicted operand value which will be used in subsequent execution of said branch instruction which is read from the same address of said memory;
   a plurality of functional units configured to execute said instructions, said plurality of functional units including a branch unit configured to execute said branch instruction by using said first predicted operand value;
   an instruction window configured to supply said instructions to said plurality of functional units;
   a register file configured such that data and results of execution of said instructions are temporarily stored in said register file; and
   a branch prediction circuit configured to predict a direction of a branch by executing said branch instruction by using said second predicted operand value.

* * * * *